(12) United States Patent
Takenaka et al.

(10) Patent No.: US 8,928,779 B2
(45) Date of Patent: Jan. 6, 2015

(54) IMAGE PICKUP APPARATUS, IMAGE PICKUP SYSTEM, AND CONTROL METHOD THEREOF

(75) Inventors: Katsuro Takenaka, Honjo (JP); Daisuke Yoshida, Ebina (JP); Toshio Kameshima, Kumagaya (JP); Tomoyuki Yagi, Honjo (JP); Keigo Yokoyama, Honjo (JP); Sho Sato, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 745 days.

(21) Appl. No.: 12/824,082

(22) Filed: Jun. 25, 2010

(65) Prior Publication Data
US 2010/0327176 A1    Dec. 30, 2010

(30) Foreign Application Priority Data
Jun. 30, 2009   (JP) ................. 2009-155665

(51) Int. Cl.
*H04N 5/217*   (2011.01)
*H04N 5/335*   (2011.01)
*H04N 5/378*   (2011.01)

(52) U.S. Cl.
CPC ............... *H04N 5/335* (2013.01); *H04N 5/378* (2013.01)
USPC ......................................... 348/241; 250/394

(58) Field of Classification Search
USPC ............................................. 250/394, 208.1
See application file for complete search history.

(56) References Cited

U.S. PATENT DOCUMENTS 5,943,094 A    8/1999   Sakai et al.
6,414,294 B1*  7/2002   Marshall et al. ........... 250/208.1
6,538,591 B2   3/2003   Sato et al.
7,291,822 B2*  11/2007  Olsen et al. ................. 250/208.1
2002/0011551 A1* 1/2002 Nair ............................ 250/208.1
2005/0206752 A1* 9/2005 Lim .............................. 348/241
2012/0001056 A1* 1/2012 Fife et al. .................... 250/208.1

FOREIGN PATENT DOCUMENTS

| EP | 1549050 A2 | 6/2005 |
|---|---|---|
| JP | 63-086976 A | 4/1988 |
| JP | 09-205587 A | 8/1997 |
| JP | 10-191169 A | 7/1998 |
| JP | 2000-188724 A | 7/2000 |
| JP | 2003-037780 A | 2/2003 |
| JP | 2009-141439 A | 6/2009 |
| WO | 2008/030327 A2 | 3/2008 |
| WO | 2008/150283 A1 | 12/2008 |

* cited by examiner

*Primary Examiner* — Daniel Hess
(74) *Attorney, Agent, or Firm* — Canon USA Inc. IP Division

(57) ABSTRACT

An image pickup apparatus includes a detection unit in which a matrix of pixels converts radiation or light into analog electrical signals, a reading circuit configured to perform signal processing operation by reading the analog electric signals on a row-by-row basis, an A/D converter configured to convert a pixel signal output from the reading circuit into pixel data, and a correction processing unit configured to correct the pixel data. A control unit performs control processing so that the reading circuit outputs reset signals to the A/D converter in a period in which the signal processing operation of a predetermined row is performed, the A/D converter converts the reset signals into pieces of reset data in the period, and the correction processing unit averages the pieces of reset data output from the A/D converter and performs subtraction with the averaged reset data and the pixel data output from the A/D converter.

14 Claims, 12 Drawing Sheets

IMAGE PICKUP APPARATUS, IMAGE PICKUP SYSTEM, AND CONTROL METHOD THEREOF

BACKGROUND OF THE INVENTION

1. Field of the Invention

The present invention relates to image pickup apparatuses, radiation imaging apparatuses, and image pickup systems which are suitable for medical diagnosis or industrial nondestructive inspection, and, more particularly, to an image pickup apparatus, a radiation imaging apparatus, and an image pickup system capable of reading a signal output from a planar detector as digital data using low-noise reading circuitry.

2. Description of the Related Art

In current years, radiation imaging apparatuses using a planar detector (hereinafter referred to as a Flat Panel Detector (FPD)) made of a semiconductor material are in practical use as image pickup apparatuses used for a medical image diagnosis or a nondestructive inspection using an X-ray. Radiation imaging apparatuses using the FPD can perform digital photographing by converting radiation such as an X-ray that has passed through a test object such as a patient into an analog electric signal with the FPD and converting the analog electric signal into a digital image signal. FPDs may be used as digital image pickup apparatuses for still image capturing (general image capturing) and moving image capturing (fluoroscopy).

U.S. Pat. No. 6,538,591 and Japanese Patent Laid-Open No. 2000-188724 disclose signal output circuits (reading circuits) used in image pickup apparatuses as those described above. U.S. Pat. No. 6,538,591 discloses a signal transfer apparatus for sequentially reading parallel signals from a plurality of computation amplifiers as a serial signal using a reading switch and converting a serial signal transmitted via an output buffer amplifier into digital data with an analog-to-digital (A/D) conversion circuit (ADC) unit. Japanese Patent Laid-Open No. 2000-188724 discloses a circuit obtained by disposing a programmable gain amplifier (PGA) at a stage prior to the output buffer amplifier in the signal transfer apparatus disclosed in U.S. Pat. No. 6,538,591. The signal transfer apparatus disclosed in U.S. Pat. No. 6,538,591 and the circuit disclosed in Japanese Patent Laid-Open No. 2000-188724 have an excellent signal-to-noise ratio (S/N) property and a high reading speed, and are suitable for the increase in the number of pixels.

Signal output circuits disclosed in U.S. Pat. No. 6,538,591 and Japanese Patent Laid-Open No. 2000-188724 are required to achieve further reduction in chip size and a higher degree of integration. Accordingly, the further reduction in size of elements used in the signal output circuits is needed. However, when small elements are used in signal output circuitry, 1/f (flicker) noise occurs. The 1/f noise can be reduced by increasing an element size. However, the opposite is also true. That is, when small elements are used, 1/f noise cannot be reduced. In such a case, 1/f noise caused by an output buffer amplifier, a PGA or an ADC unit, which are disposed at stages subsequent to a reading switch, generates a low-frequency artifact on an image. In particular, since radiation imaging apparatuses require a wide dynamic range, it is necessary to use a low-noise reading circuit in these radiation imaging apparatuses.

SUMMARY OF THE INVENTION

The present invention provides an image pickup apparatus and an image pickup system capable of reducing an artifact caused by 1/f noise on an acquired image even if small elements are used in the signal output circuits.

An image pickup apparatus according to an embodiment of the present invention includes: a detection unit having a matrix of pixels for converting radiation or light into analog electric signals; a reading circuit configured to perform a signal processing operation for reading the analog electric signals output from the matrix of pixels on a row-by-row basis; an analog-to-digital (A/D) converter configured to convert a pixel signal transmitted from the reading circuit into pixel data that is digital data; a correction processing unit configured to perform correction processing on the pixel data; and a control unit configured to control the reading circuit, the A/D converter, and the correction processing unit. The reading circuit includes a reset unit configured to output a reset signal to the A/D converter. The control unit controls the reading circuit, the A/D converter, and the correction processing unit so that the reading circuit outputs a plurality of reset signals to the A/D converter in a period in which the signal processing operation of a predetermined row is performed, the A/D converter converts the plurality of reset signals into a plurality of pieces of reset data that are pieces of digital data in the period, and the correction processing unit averages the plurality of pieces of reset data output from the A/D converter and performs subtraction processing with averaged reset data and the pixel data output from the A/D converter.

An image pickup system according to an embodiment of the present invention includes: the image pickup apparatus; and a display unit capable of displaying an image with image data acquired by the image pickup apparatus.

A control method of an image pickup apparatus including a detection unit in which a matrix of pixels converts radiation or light into analog electric signals, a reading circuit configured to perform a signal processing operation for reading the analog electric signals output from the matrix of pixels on a row-by-row basis, an A/D converter configured to convert a pixel signal transmitted from the reading circuit into pixel data that is digital data, and a correction processing unit configured to perform correction processing on the pixel data, includes the steps of: controlling the reading circuit to output a plurality of reset signals output from a reset unit included in the reading circuit and to output the pixel signal to the A/D converter in a period in which the signal processing operation of a predetermined row is performed; controlling the A/D converter to convert the pixel signal output from the reading circuit into pixel data that is digital data and to convert the plurality of reset signals output from the reading circuit into a plurality of pieces of reset data that are pieces of digital data in the period; and controlling the correction processing unit to average the plurality of pieces of reset data output from the A/D converter in the period and to perform subtraction processing with the pixel data output from the A/D converter and the averaged reset data.

According to an embodiment of the present invention, it is possible to provide an image pickup apparatus and an image pickup system capable of reducing an artifact caused by 1/f noise on an acquired image even if small elements are used.

Further features of the present invention will become apparent to a person having ordinary skill in the art from the following description of exemplary embodiments with reference to the attached drawings.

DESCRIPTION OF THE EMBODIMENTS

Embodiments of the present invention will be described in detail below with reference to the accompanying drawings.

First Embodiment

Figure 1:
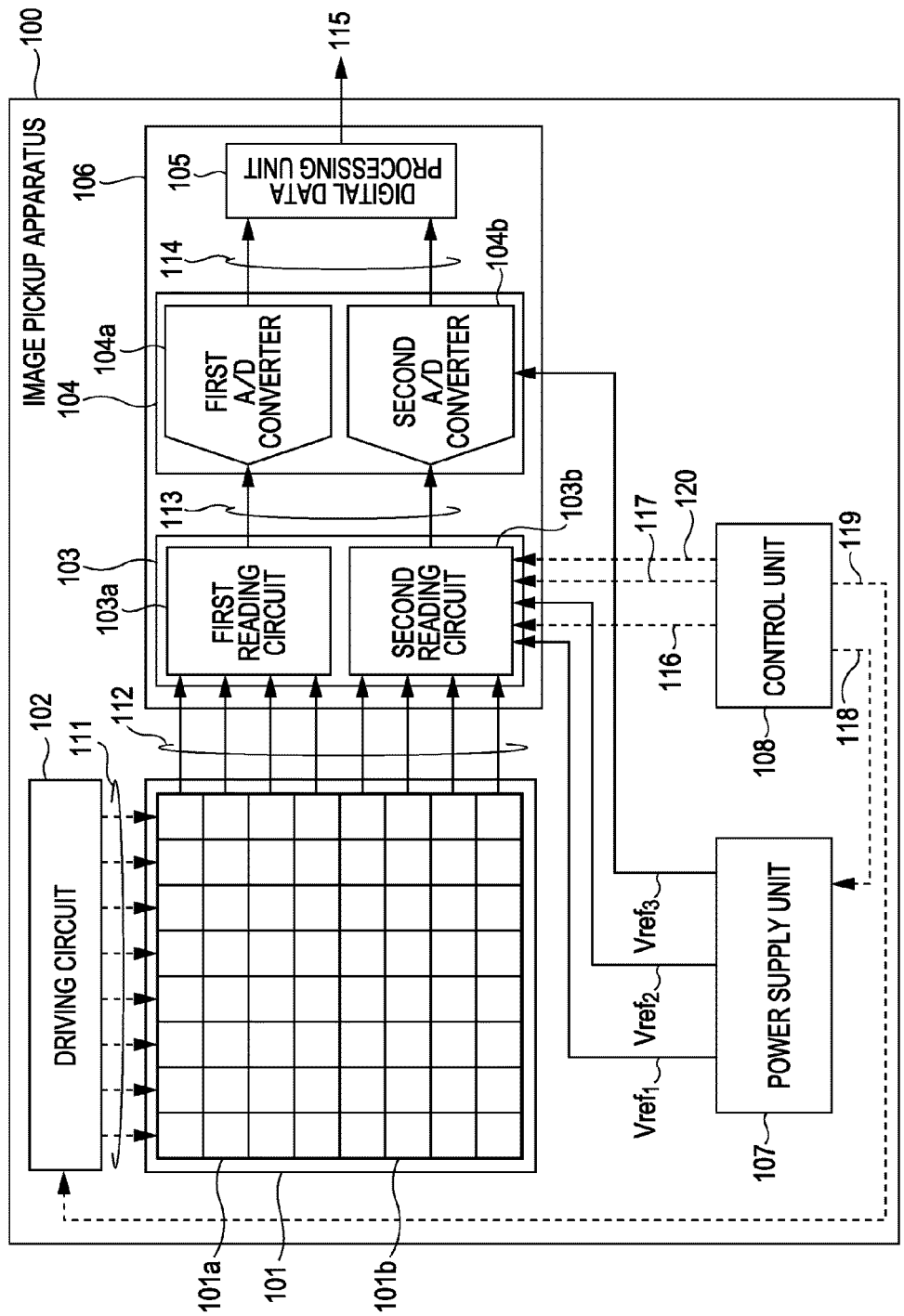
FIG. 1 is a schematic block diagram of an image pickup apparatus according to a first embodiment of the present invention.

FIG. 1 is a schematic block diagram of an image pickup apparatus according to the first embodiment of the present invention. Referring to FIG. 1, an image pickup apparatus 100 includes a detection unit 101 in which a plurality of pixels for converting a radiation or light into an analog electric signal are arranged in a matrix, and a driving circuit 102 for driving the detection unit 101 to cause the detection unit 101 to output an analog electric signal. In the first embodiment, for simplification of explanation, the detection unit 101 includes pixels in a matrix of eight rows×eight columns, and is divided into a first pixel group 101a including four pixel columns and a second pixel group 101b including four pixel columns. A pixel signal that is an analog electric signal output from a pixel included in the first pixel group 101a is read by a first reading circuit 103a. A pixel signal 113 output from the first reading circuit 103a is converted into digital data 114 by a first A/D converter 104a. An analog electric signal output from the second pixel group 101b is read by a second reading circuit 103b and is then converted into digital data by a second A/D converter 104b. Pieces of digital data output from the first A/D converter 104a and the second A/D converter 104b are subjected to signal processing (to be described later), digital multiplex processing, offset correction, etc. in a digital data processing unit 105 and are then output as a digital image signal. A signal processing section 106 includes a reading circuit unit 103 including the first reading circuit 103a and the second reading circuit 103b, an A/D conversion unit 104 including the first A/D converter 104a and the second A/D converter 104b, and the digital data processing unit 105. The image pickup apparatus 100 further includes a power supply unit 107 for supplying a corresponding bias to the signal processing section 106. The power supply unit 107 supplies a reference voltage $Vref_1$, $Vref_2$, or $Vref_3$ to the reading circuit unit 103, and A/D conversion unit 104. The image pickup apparatus 100 further includes a control unit 108 for controlling at least one of the signal processing section 106 and the power supply unit 107. The control unit 108 supplies a control signal 118 to the power supply unit 107, supplies control signals 116, 117, and 120 to the reading circuit unit 103, and supplies a driving control signal 119 to the driving circuit 102. In response to the driving control signal 119, the driving circuit 102 supplies a driving signal 111 to the detection unit 101.

Figure 2A:
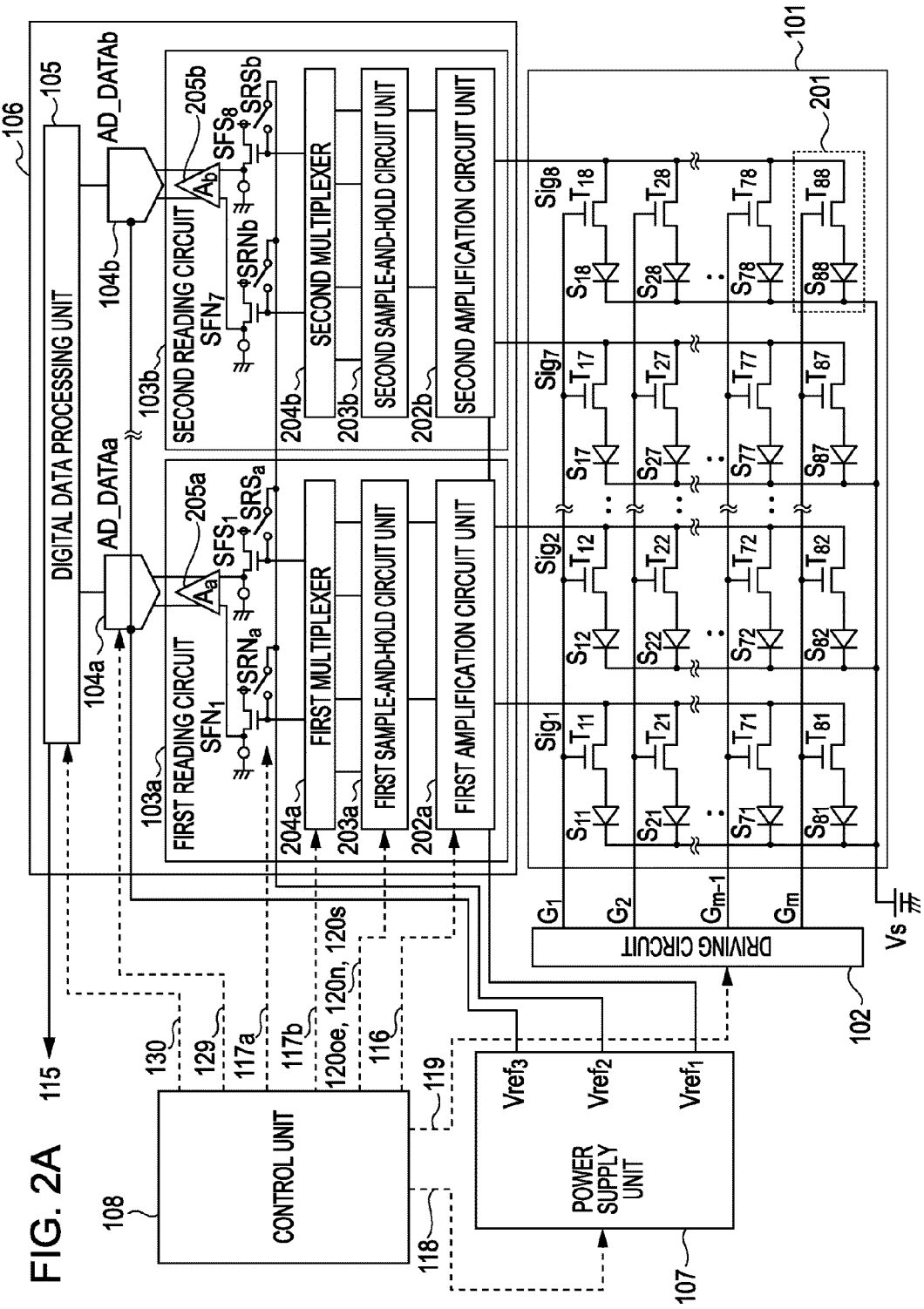
FIGS. 2A and 2B are schematic equivalent circuit diagrams of an image pickup apparatus according to the first embodiment of the present invention.

FIG. 2A is a schematic equivalent circuit diagram of an image pickup apparatus according to the first embodiment of the present invention. In FIG. 2A, the same reference numerals are used to identify parts already described with reference to FIG. 1, and the description thereof will be therefore omitted. The detection unit 101 includes pixels 201 arranged in a matrix. Referring to FIG. 2A, the number of pixels 201 in the matrix is 8×8 pixels, and are arranged in eight rows and eight columns. Each of the pixels 201 includes a conversion element S for converting a radiation or light into an electrical charge and a switch element T for outputting an electric signal corresponding to the electrical charge. As the conversion element S for converting light into an electrical charge, a photoelectric conversion element, for example, a PIN photodiode that is mainly made of amorphous silicon and is disposed on an insulating substrate such as a glass substrate, is preferably used. As the conversion element S for converting a radiation into an electrical charge, an indirect conversion element obtained by providing a wavelength converter for converting a radiation into light of detectable spectrum band on the radiation entering side of the above-described photoelectric conversion element or a direct conversion element for directly converting a radiation into an electrical charge is preferably used. As the switch element T, a transistor having a control terminal and two main terminals is preferably used. When a photoelectric conversion element is disposed on an insulating substrate in a pixel, a thin-film transistor (TFT) is used as the switch element T. One electrode of the conversion element S is electrically connected to one of two main terminals of the switch element T, and the other electrode of the conversion element S is electrically connected to a bias power supply 107 via a common line. The switch elements T included in a plurality of pixels in the row direction, for example, the switch elements $T_{11}$ to $T_{18}$, individually have control terminals electrically connected to a driving line $G_1$ in a first row. A driving signal for controlling the conductive state of a switch element is supplied from the driving circuit 102 to the switch element T via a driving line on a row-by-row basis. The switch elements T included in a plurality of pixels in the column direction, for example, the switch elements $T_{11}$ to $T_{81}$, individually have the other main terminals electrically connected to a signal line $Sig_1$ in a first column. When the switch element T is in a conductive state, the switch element T outputs an electric signal corresponding to an electrical charge of the conversion element S to the reading circuit unit 103 via a signal line. A plurality of signal lines $Sig_1$ to $Sig_8$ disposed in the column direction transfer electric signals output from a plurality of pixels in the detection unit 101 to the reading circuit unit 103 in parallel. In the first embodiment, the detection unit 101 is divided into the first pixel group 101a and the second pixel group 101b each having four columns of pixels. Analog electric signals output from pixels in the first pixel group 101a are read in parallel by the first reading circuit 103a in the reading circuit unit 103, and analog electric signals output from pixels in the second pixel group 101b are read in parallel by the second reading circuit 103b in the reading circuit unit 103.

The first reading circuit 103a includes a first amplification circuit unit 202a for amplifying electric signals that are output in parallel from the first pixel group 101a and a first sample-and-hold circuit unit 203a for sampling and holding an electric signal transmitted from the first amplification circuit unit 202a. The second reading circuit 103b similarly includes a second amplification circuit unit 202b and a second sample-and-hold circuit unit 203b. The first reading circuit 103a further includes a first multiplexer 204a for sequentially receiving electric signals that are output in parallel from the first sample-and-hold circuit unit 203a and outputting a serial signal as an image signal and a first variable amplifier 205a that is an output buffer for performing impedance conversion upon the image signal and outputting a converted signal. The second reading circuit 103b similarly further includes a second multiplexer 204b and a second variable amplifier 205b. An electric signal transmitted from a pixel is input into the first variable amplifier 205a or the second variable amplifier 205b via a signal buffer SFS. A noise component is input into the first variable amplifier 205a or the second variable amplifier 205b via a noise buffer SFN. The first variable amplifier 205a performs subtraction using the electric signal transmitted from the pixel and the noise component and outputs a result of the subtraction to the first A/D converter 104a. The second variable amplifier 205b similarly performs subtraction using the electric signal transmitted from the pixel and the noise component and outputs a result of the subtraction to the second A/D converter 104b. The power supply unit 107 supplies the reference voltage $Vref_3$ to the first A/D converter 104a and the second A/D converter 104b. Here, the reference voltage $Vref_2$ is input from the power supply unit 107 into the gates of the signal buffers SFS of the first reading circuit 103a and the second reading circuit 103b via reset switches SRS at a predetermined time. The reference voltage $Vref_2$ is input from the power supply unit 107 to the gates of the noise buffers SFN of the first reading circuit 103a and the second reading circuit 103b via reset switches SRN at a predetermined time. That is, a reset switch SR supplies the reference voltage $Vref_2$ to the gate of a buffer SF at a predetermined time so as to reset the input of a variable amplifier.

The control unit 108 supplies the control signal 116 to the first amplification circuit unit 202a and the second amplification circuit unit 202b, supplies a control signal 117a to the reset switches SRS and the reset switches SRN, supplies a control signal 117b to the first multiplexer 204a and the second multiplexer 204b, supplies control signals 120s, 120n, and 120oe to the first sample-and-hold circuit unit 203a and the second sample-and-hold circuit unit 203b, supplies a control signal 129 to the first A/D converter 104a and second A/D converter 104b, and supplies a control signal 130 to the digital data processing unit 105.

Figure 2B:
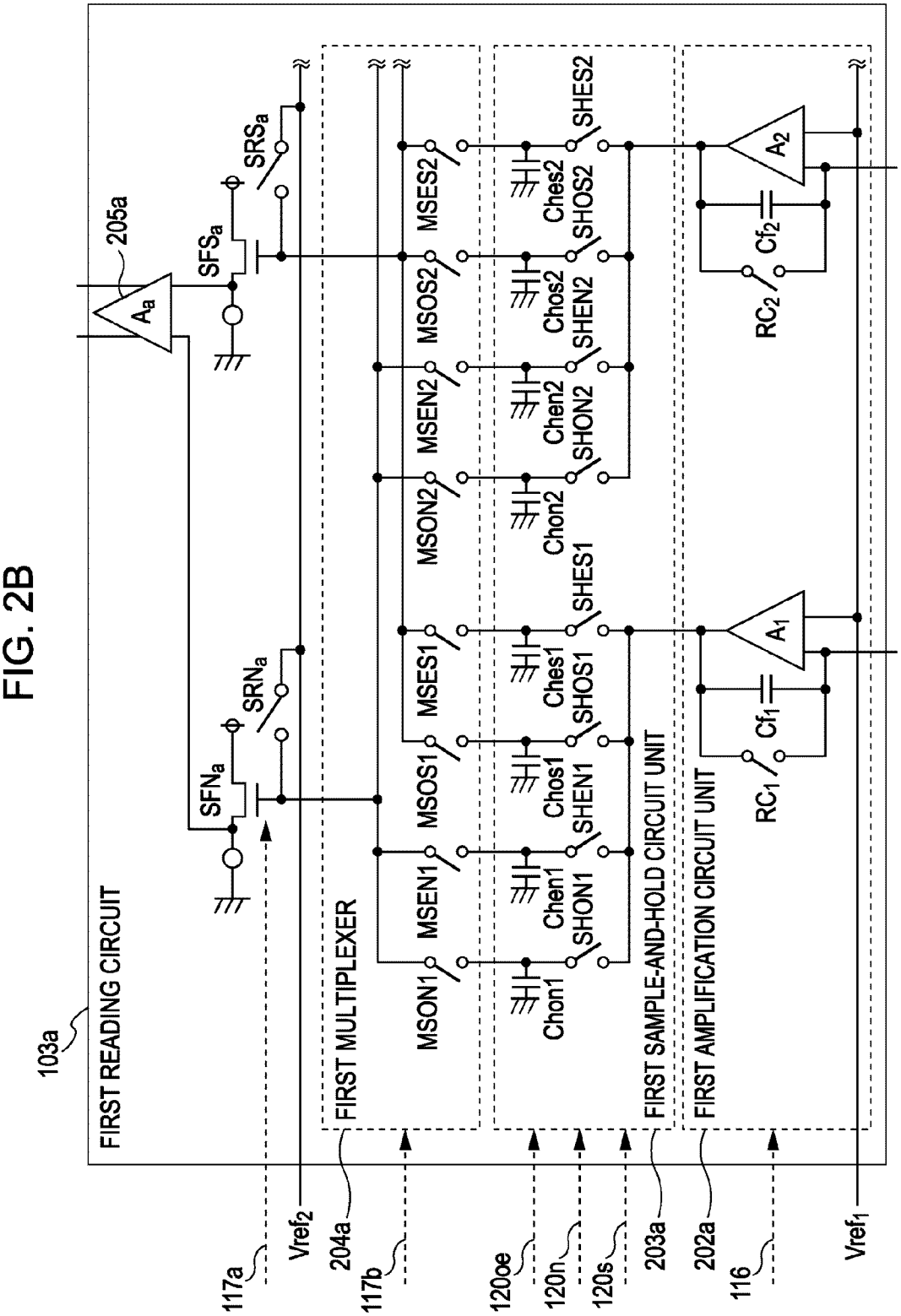

FIG. 2B is an equivalent circuit diagram describing the reading circuit unit 103 in detail. An amplification circuit unit 202 is provided with an amplification circuit corresponding to each signal line. The amplification circuit includes a computation amplifier A for amplifying an electric signal (pixel signal) read from a pixel and outputting an amplified signal, an integral capacitor Cf, and a reset switch RC for resetting the integral capacitor Cf. The computation amplifier A receives an output electric signal from an inverting input terminal and outputs an amplified electric signal from an output terminal. The reference voltage $Vref_1$ is input from the power supply unit 107 into the non-inverting input terminal of the computation amplifier A. The integral capacitor Cf is connected between the inverting input terminal and the output terminal of the computation amplifier A, and is connected in parallel to the reset switch RC. A sample-and-hold circuit unit 203 is provided with an odd-row signal sample-and-hold circuit, an even-row signal sample-and-hold circuit, an odd-row noise sample-and-hold circuit, and an even-row noise sample-and-hold circuit. These sample-and-hold circuits correspond to each amplification circuit. The odd-row signal sample-and-hold circuit includes a sampling switch SHOS for sampling an electric signal output from a pixel in an odd-numbered row and a sampling capacitor Chos for storing a pixel signal of the odd-numbered row. The even-row signal sample-and-hold circuit includes a sampling switch SHES for sampling an electric signal output from a pixel in an even-numbered row and a sampling capacitor Ches for storing a pixel signal of the even-numbered row. The odd-row noise sample-and-hold circuit includes a sampling switch SHON for sampling a noise component of the computation amplifier before sampling a pixel signal of an odd-numbered row and a sampling capacitor Chon for storing a noise signal. The even-row noise sample-and-hold circuit includes a sampling switch SHEN for sampling a noise component of the computation amplifier before sampling a pixel signal of an even-numbered row and a sampling capacitor Chen for storing a noise signal. A multiplexer 204 includes a switch MSOS for the odd-row signal sample-and-hold circuit, a switch MSES for the even-row signal sample-and-hold circuit, a switch MSON for the odd-row noise sample-and-hold circuit, and a switch MSEN for the even-row noise sample-and-hold circuit. These switches correspond to each amplification circuit. The multiplexer 204 sequentially selects these switches, thereby converting pixel parallel signals or noise parallel signals into a series signal.

Figure 3:
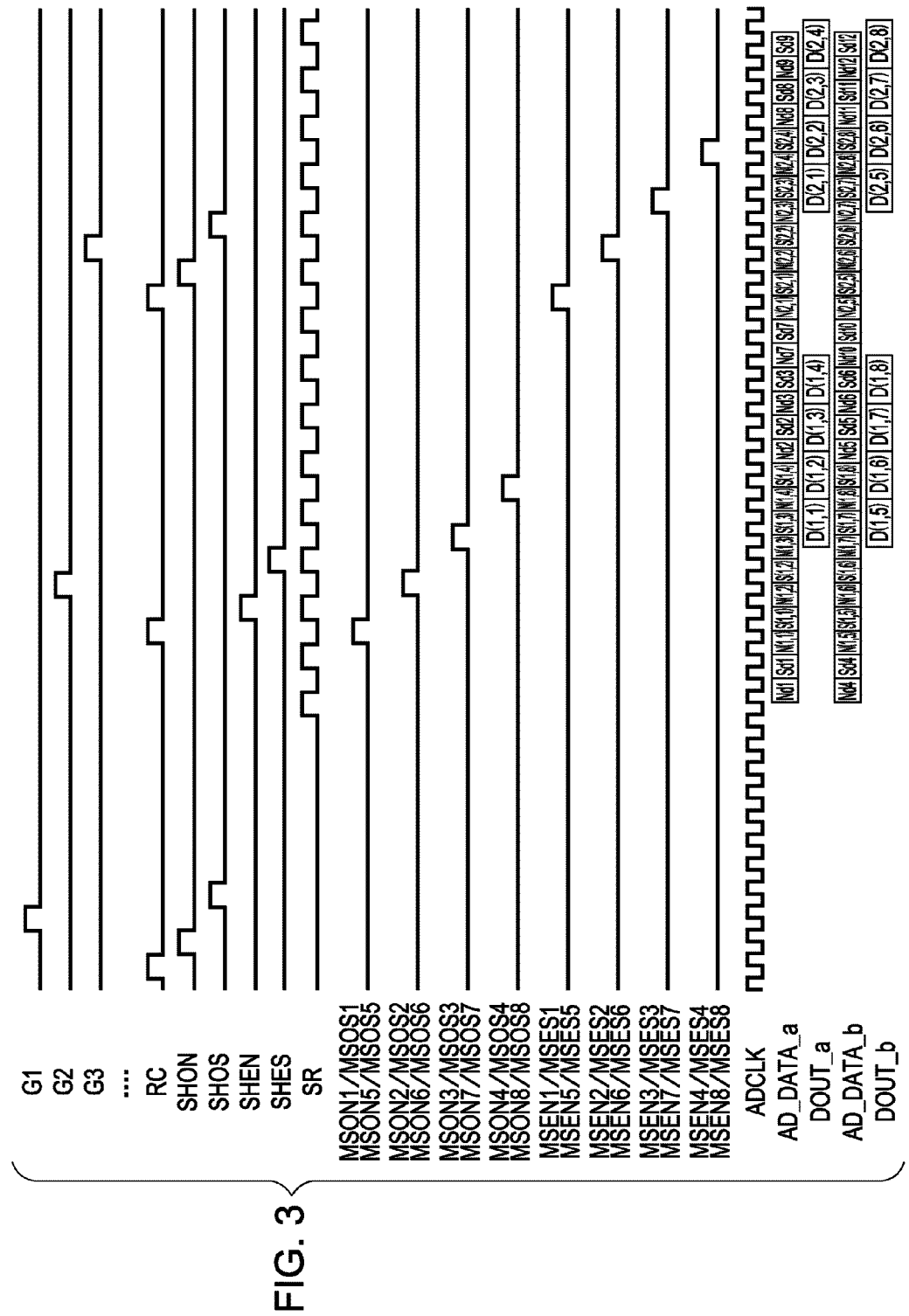
FIG. 3 is a timing chart describing an image pickup operation performed by an image pickup apparatus according to the first embodiment of the present invention.

The operation of an image pickup apparatus according to an embodiment of the present invention will be described with reference to FIGS. 2A, 2B, and 3. FIG. 3 is a timing chart describing the image pickup operation of an image pickup apparatus according to the first embodiment of the present invention.

First, the image pickup apparatus 100 performs a pixel output operation on a row-by-row basis. When the detection unit 101 is exposed to a radiation or light, each conversion element S generates an electrical charge corresponding to the radiation or light. When the control unit 108 supplies the control signal 116 to the reset switch RC, the reset switch RC resets the integral capacitor Cf and the amplification circuit unit is reset. When the control unit 108 supplies control signals 120n and 120oe to the sample-and-hold circuit unit, the sampling switch SHON of the odd-row noise sample-and-hold circuit is turned on and the noise component of the reset amplification unit is transferred to the sampling capacitor Chon. When the sampling switch SHON is turned off, the noise component is stored in the sampling capacitor Chon. When the driving circuit 102 supplies a driving signal to the driving line $G_1$ in the first row, the switching elements $T_{11}$ to $T_{18}$ are turned on. As a result, analog electric signals corresponding to electrical charges generated by the conversion elements $S_{11}$ to $S_{14}$ in the first row are transferred in parallel from pixels to the first reading circuit 103a through the signal lines $Sig_1$ to $Sig_4$, respectively, and analog electric signals corresponding to electrical charges generated by the conversion elements $S_{15}$ to $S_{18}$ in the first row are transferred in parallel from pixels to the second reading circuit 103b through the signal lines $Sig_5$ to $Sig_8$, respectively. When the control unit 108 supplies the control signals 120s and 120oe to the sample-and-hold circuit unit, the sampling switch SHOS of the odd-row signal sample-and-hold circuit is turned on and a read pixel signal is transferred to the sampling capacitor Chos via the amplification circuit. At that time, the noise component of the amplification circuit is added to the pixel signal. When the sampling switch SHOS is turned off, the pixel signal including the noise component is stored in the sampling capacitor Chos.

Subsequently, the image pickup apparatus 100 performs the following signal processing operation. When the control unit 108 supplies the control signal 117a to the reset switches SRS and SRN, the reset switches SRS and SRN are turned on, the reference voltage $Vref_2$ is supplied to the gates of the signal buffers SFS and SFN, and the inputs of the first variable amplifier 205a and the second variable amplifier 205b are reset. That is, the reset switches SRS and SRN are reset units for outputting a reset signal to an A/D converter. At that time, the first A/D converter 104a and the second A/D converter 104b convert outputs of the first variable amplifier 205a and the second variable amplifier 205b into digital data $N_{d1}$ and digital data $N_{d4}$, and output the digital data $N_{d1}$ and the digital data $N_{d4}$ to the digital data processing unit 105, respectively. The digital data $N_{d1}$ and the digital data $N_{d4}$ include 1/f noise components of the first variable amplifier 205a and the second variable amplifier 205b, respectively, and are the reset data of the first variable amplifier 205a and the reset data of the second variable amplifier 205b, respectively. When the reset switches SRS and SRN are turned off, the first A/D converter 104a and the second A/D converter 104b convert the outputs of the first variable amplifier 205a and the second variable amplifier 205b into digital data $S_{d1}$ and digital data $S_{d4}$, and output the digital data $S_{d1}$ and the digital data $S_{d4}$ to the digital data processing unit 105, respectively. This operation is referred to as a pseudo reset data output operation.

When the reset switches SRS and SRN are turned on again, the reference voltage $Vref_2$ is supplied to the gates of the signal buffers SFS and SFN and the inputs of the first variable amplifier 205a and the second variable amplifier 205b are reset again. At that time, in response to the control signal 129 transmitted from the control unit 108, the first A/D converter 104a and the second A/D converter 104b convert the outputs of the first variable amplifier 205a and the second variable amplifier 205b into digital data N(1, 1) and digital data N(1, 5) and output the digital data N(1, 1) and the digital data N(1, 5) to the digital data processing unit 105, respectively. Like the digital data $N_{d1}$ and the digital data $N_{d4}$, the digital data N(1, 1) and the digital data N(1, 5) include the 1/f noise components of the first variable amplifier 205a and the second variable amplifier 205b, respectively, and are reset data of the first variable amplifier 205a and reset data of the second variable amplifier 205b, respectively. This operation is referred to as a reset data output operation.

When the control unit 108 supplies the control signal 117b to each multiplexer, a switch MSOS1 and a switch MSON1 in the first multiplexer 204a are turned on. As a result, pixel signals including noise components output from pixels in the first column are input into the first variable amplifier 205a via the signal buffer SFS, and the noise components are input into the first variable amplifier 205a via the noise buffer SFN. Switches MSOS5 and MSON5 in the second multiplexer 204b are simultaneously turned on. As a result, pixel signals including noise components output from pixels in the fifth column are input into the second variable amplifier 205b via the signal buffer SFS, and the noise components are input into the second variable amplifier 205b via the noise buffer SFN. Each variable amplifier calculates the difference between the pixel signal including the noise component and the noise component, amplifies a result of the calculation, and outputs an amplified pixel signal. As a result, the noise component of each amplification circuit is removed from the output of the amplification circuit. The first A/D converter 104a converts an output pixel signal into digital data S(1, 1) and outputs the digital data S(1, 1) to the digital data processing unit 105. The second A/D converter 104b converts an output pixel signal into digital data S(1, 5) and outputs the digital data S(1, 5) to the digital data processing unit 105. Each of the digital data S(1, 1) and the digital data S(1, 5) is data obtained by adding a 1/f noise component of a variable amplifier to a pixel signal. This operation is referred to as a pixel data output operation.

Subsequently, the reset data output operation is performed again. Digital data N(1, 2) and digital data N(1, 6) are output from the first A/D converter 104a and the second A/D converter 104b to the digital data processing unit 105, respectively.

The pixel data output operation is performed upon the second column and the sixth column. Digital data S(1, 2) and digital data S(1, 6) are output from the first A/D converter 104a and the second A/D converter 104b to the digital data processing unit 105, respectively.

The reset data output operation, the pixel data output operation for the third column and the seventh column, the reset data output operation, and the pixel data output operation for the fourth column and the eighth column are sequentially performed in this order. Consequently, digital data N(1, 3), digital data N(1, 7), digital data S(1, 3), digital data S(1, 7), digital data N(1, 4), digital data N(1, 8), digital data S(1, 4), and digital data S(1, 8) are output to the digital data processing unit 105.

Subsequently, the pseudo reset data output operation is performed two times. Digital data $N_{d2}$, digital data $N_{d5}$, digital data $S_{d2}$, digital data $S_{d5}$, digital data $N_{d3}$, digital data $N_{d6}$, digital data $S_{d3}$, and digital data $S_{d6}$ are output to the digital data processing unit 105.

The digital data processing unit 105 performs correction processing to be described later upon these pieces of data output from the A/D converters and outputs pieces of corrected pixel data D(1, 1) to D(1, 4) and D(1, 5) to D(1, 8).

Thus, the signal processing operation in units of rows includes the pseudo reset data output operation, the reset data output operation and the pixel data output operation in units of columns, and the pseudo reset data output operation performed two times. With the pixel output operation in units of rows and the signal processing operation in units of rows, the pixel reading operation in units of rows is achieved. The pixel reading operation in units of rows is repeated, so that the reading operation of a single image is achieved.

In the first embodiment, the pixel output operation of the second row is performed while the signal processing operation of the first row is performed. Like in the case of the first row, the integral capacitor Cf is reset by the reset switch RC, so that the amplification circuit is reset. When the sampling switch SHEN of the even-row noise sample-and-hold circuit is turned on, the noise component of the reset amplification circuit is transferred to the sampling capacitor Chen. When the sampling switch SHEN is turned off, the noise component is stored in the sampling capacitor Chen. When the driving circuit 102 supplies a driving signal to a driving line $G_2$ in the second row, switching elements $T_{21}$ to $T_{28}$ in the second row are turned on. Analog electric signals corresponding to electrical charges generated by conversion elements $S_{21}$ to $S_{24}$ in the second row are individually transferred in parallel from pixels to the first reading circuit 103a through the signal lines $Sig_1$ to $Sig_4$. Analog electric signals corresponding to electrical charges generated by conversion elements $S_{25}$ to $S_{28}$ in the second row are individually transferred in parallel from pixels to the second reading circuit 103b via the signal lines $Sig_5$ to Sig$_8$. When the sampling switch SHES of the even-row signal sample-and-hold circuit is turned on, the read pixel signal is transferred to the sampling capacitor Ches via the amplification circuit. At that time, the noise component of the amplification circuit is added to the pixel signal. When the sampling switch SHES is turned off, the pixel signal including the noise component is stored in the sampling capacitor Ches. In the pixel data output operation of the second row, like in the case of the pixel data output operation of the first row, an operation similar to that performed upon the first row is performed except that the switch MSES and the switch MSEN in each multiplexer are sequentially turned on. Since the above-described output operation and the above-described signal processing operation are performed, it is possible to perform the next output operation in units of rows while the last signal processing operation in units of rows is performed. Accordingly, as compared with a case in which the next output operation in units of rows is performed after the last signal processing operation in units of rows has been completed, a time required for the reading operation of a single image can be reduced.

Figure 4A:
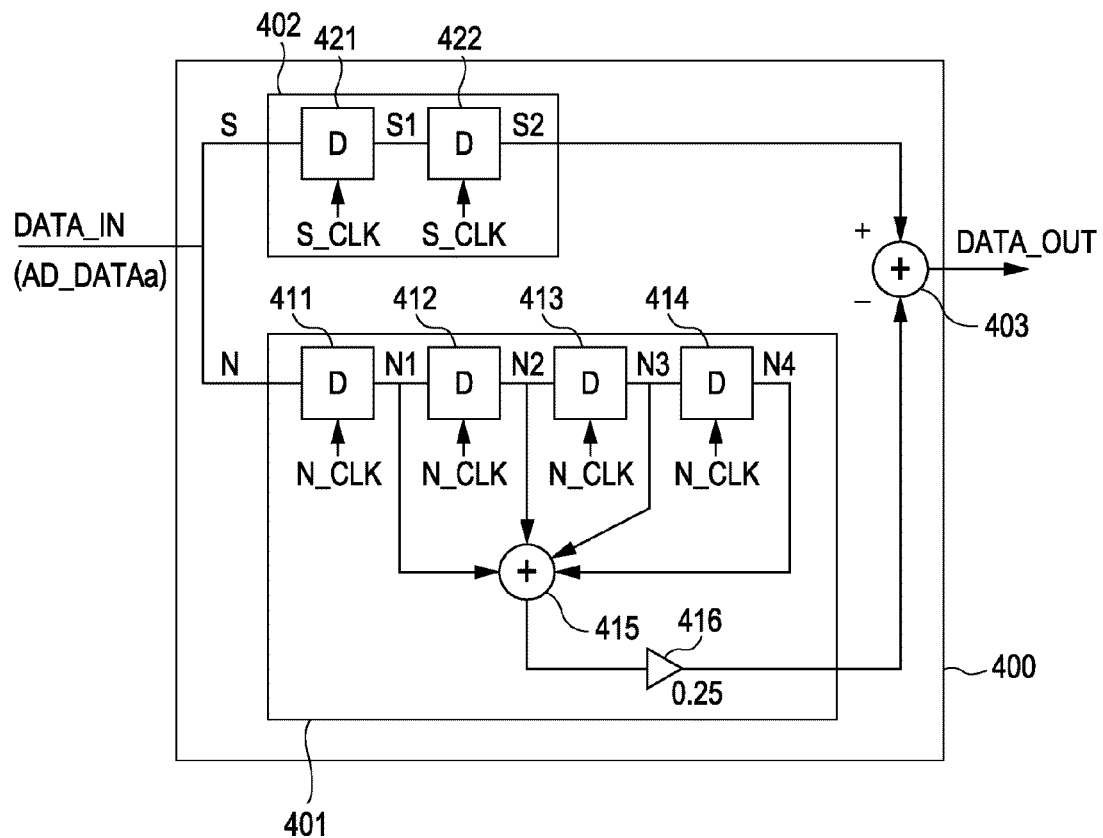
FIG. 4A is a block diagram illustrating a correction processing unit included in an image pickup apparatus according to the first embodiment of the present invention.
Figure 4B:
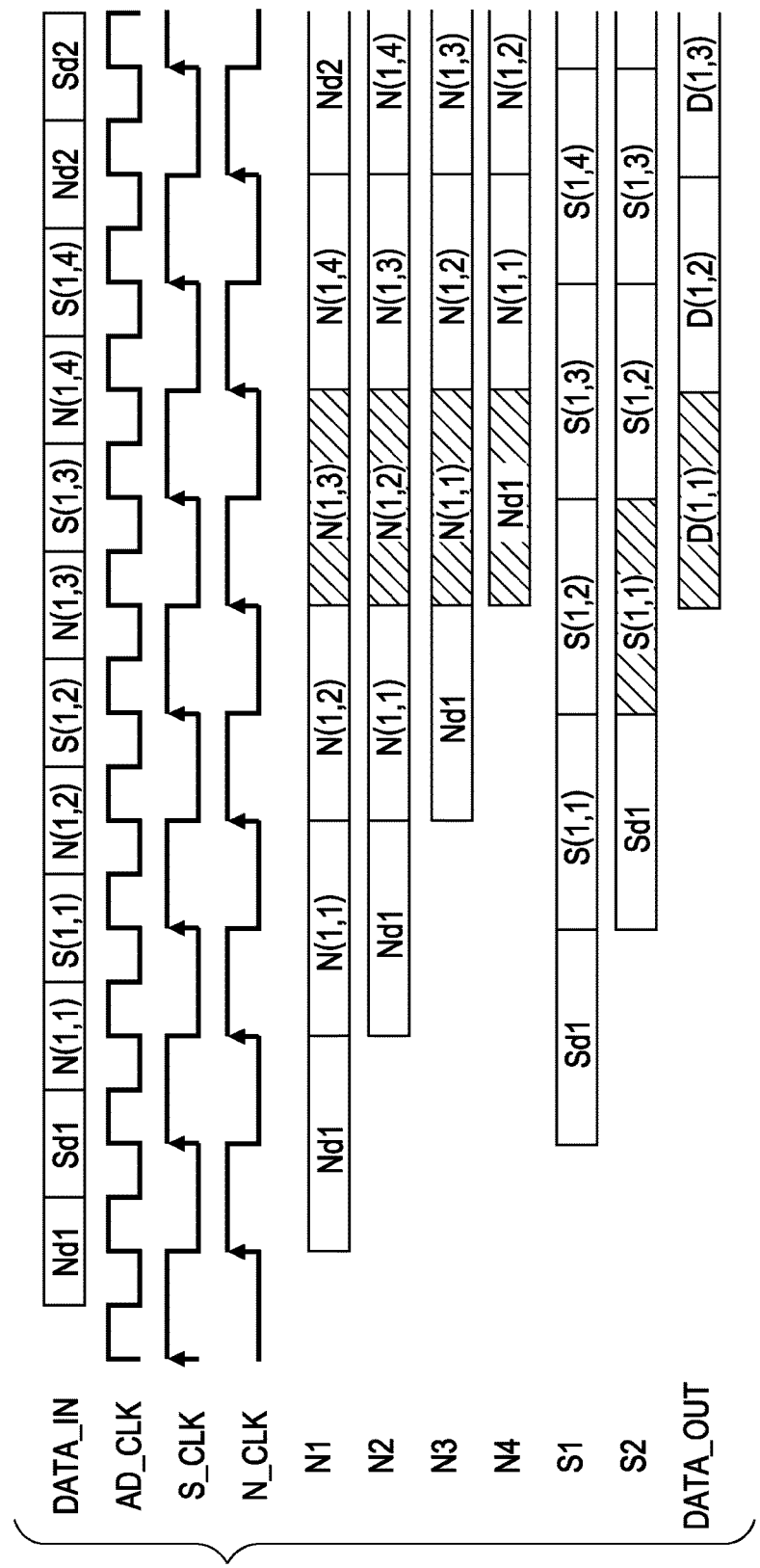
FIG. 4B is a timing chart describing correction processing performed by an image pickup apparatus according to the first embodiment of the present invention.

Next, the correction processing performed by the digital data processing unit 105 will be described with reference to FIGS. 4A and 4B. FIG. 4A is a block diagram describing a correction processing unit 400 included in the digital data processing unit 105. FIG. 4B is a timing chart describing correction processing performed by the correction processing unit 400. In the first embodiment, the correction processing unit 400 is disposed for each A/D converter. In the following description, it is assumed that the correction processing unit 400 is disposed for the first A/D converter 104a. However, the correction processing unit 400 may perform correction processing upon data obtained by performing digital multiplexing of pieces of data output from the first and second A/D converters.

The correction processing unit 400 includes a reset data processing unit 401, a pixel data processing unit 402, and an adder 403. The reset data processing unit 401 includes a plurality of delay elements 411 to 414, an adder 415, and a multiplier 416. The pixel data processing unit 402 includes a plurality of delay elements 421 and 422.

In response to the control signal 130 transmitted from the control unit 108, N_CLK is supplied to the delay elements 411 to 414 in the reset data processing unit 401 and S_CLK is supplied to the delay elements 421 and 422 in the pixel data processing unit 402. The digital data $N_{d1}$ output from the first A/D converter 104a is input into the correction processing unit 400, and is stored in the delay element 411 in the reset data processing unit 401 in accordance with the rise of N_CLK. Subsequently, the digital data $S_{d1}$ is input into the correction processing unit 400, and is stored in the delay element 421 in the pixel data processing unit 402 in accordance with the rise of S_CLK. Subsequently, the digital data N(1, 1) is input into the correction processing unit 400 and is stored in the delay element 411 in accordance with the rise of N_CLK, and the digital data $N_d$ is stored in the delay element 412. Subsequently, the digital data S(1, 1) is input into the correction processing unit 400 and is stored in the delay element 421 in accordance with the rise of S_CLK. Subsequently, the digital data N(1, 2) is input into the correction processing unit 400 and is stored in the delay element 411 in accordance with the rise of N_CLK, the digital data N(1, 1) is stored in the delay element 412, the digital data $N_{d1}$ is stored in the delay element 413. Subsequently, the digital data S(1, 2) is input into the correction processing unit 400 and is stored in the delay element 421 in accordance with the rise of S_CLK, and the digital data S(1, 1) is stored in the delay element 422 and is then output from the delay element 422 to the adder 403. Subsequently, the digital data N(1, 3) is input into the correction processing unit 400 and is stored in the delay element 411 in accordance with the rise of N_CLK, the digital data N(1, 2) is stored in the delay element 412, the digital data N(1, 1) is stored in the delay element 413, and the digital data $N_{d1}$ is stored in the delay element 414. The outputs of the delay elements 411 to 414 are output to the adder 415 and are then added by the adder 415. The quarter (0.25) of a result of the addition is calculated by the multiplier 416 for averaging and is then output to the adder 403. The adder 403 performs subtraction processing with data output from the pixel data processing unit 402 and data output from the reset data processing unit 401 and outputs corrected pixel data D(1, 1). One possible example of how the corrected pixel data may be calculated follows. Namely, the corrected pixel data D(1, 1) is calculated as follows: S(1, 1)−($N_{d1}$+N(1, 1)+N(1, 2)+N(1, 3))/4. Corrected pixel data D(1, 2) is similarly calculated as follows: S(1, 2)−(N(1, 1)+N(1, 2)+N(1, 3)+N(1, 4))/4. That is, in the correction processing, in a period in which the signal processing operation in units of rows is performed, a reading circuit unit supplies a plurality of reset signals to an A/D converter. The A/D converter converts the reset signals into a plurality of pieces of reset data. A correction processing unit averages the pieces of reset data output from the A/D converter. The correction processing unit acquires corrected pixel data by performing subtraction processing with pixel data of a predetermined row output from the A/D converter in the same period and the averaged reset data. In other words, subtraction processing includes subtracting the averaged reset data from the pixel data of a predetermined row output from the A/D converter during a predetermined period. The averaged reset data and the pixel data are output at substantially the same time (simultaneously) during the predetermined period (e.g., one clock cycle) as exemplary illustrated in FIG. 4B by the shaded pieces of data.

In the first embodiment, two pieces of reset data that are temporally close to pixel data to be subjected to the correction processing and are obtained before the pixel data and two pieces of reset data that are temporally close to the pixel data and are obtained after the pixel data, that is, four pieces of reset data in total, are averaged. However, the number of pieces of reset data is not limited thereto. On condition that the number of pieces of reset data obtained before correction target pixel data is the same as that of pieces of reset data obtained after the correction target pixel data, any number of pieces of reset data may be used. Similarly, in the above description, the quarter (0.25) of a result of the addition is calculated by the multiplier 416 for averaging and is then output to the adder 403. The calculation of the multiplier 416 is not limited to a quarter; other percentages can be determined based, for example, on the amount of 1/f noise.

Figure 5A:
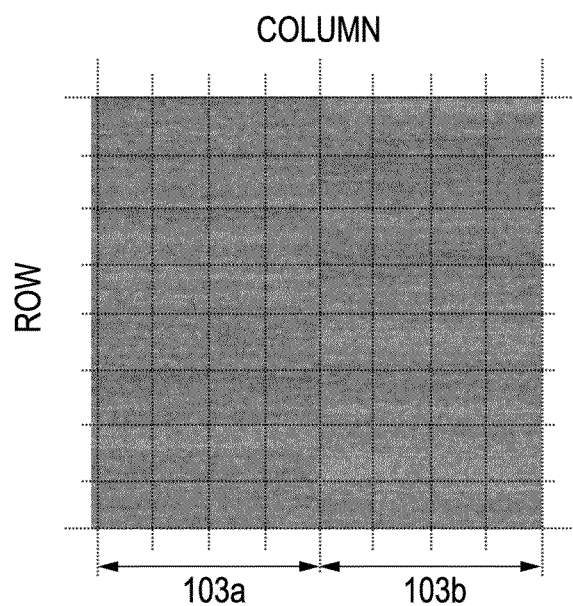
FIGS. 5A and 5B are exemplary images that illustrate the effect of an embodiment of the present invention.
Figure 5B:
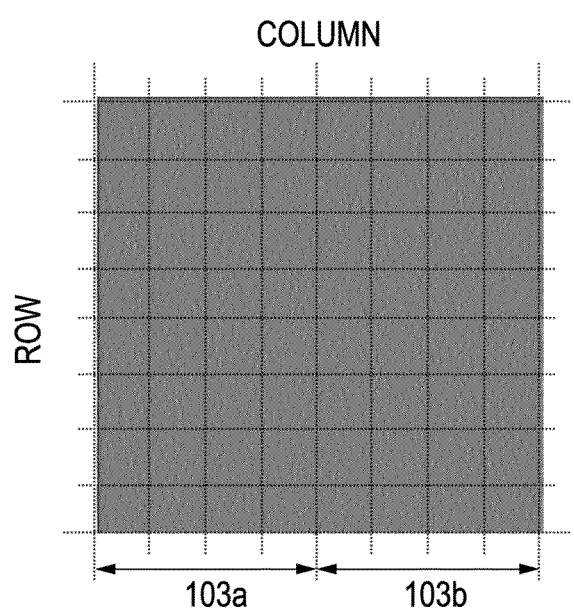

The effect of the present invention will be described with reference to FIGS. 5A and 5B. FIG. 5A is a diagram illustrating an image obtained when the above-described correction processing is not performed. FIG. 5B is a diagram illustrating an image obtained when the above-described correction processing is performed. In comparing FIG. 5A to FIG. 5B, it can be appreciated that when the above-described correction processing is not performed (FIG. 5A), noise in the form of horizontal stripes is readily evident. In contrast, in the image obtained when the above-described correction processing is performed (FIG. 5B), noise in the form of stripes is inconspicuous. The reason for this remarkable effect is that a high-frequency noise component is suppressed by averaging pieces of reset data including a high-frequency noise component and a low-frequency 1/f noise component. That is, it can be considered that the averaging of these pieces of reset data is equivalent to the low-pass filtering (LPF) of these pieces of reset data. Accordingly, noise included in reset data obtained after the averaging is almost low-frequency 1/f noise. When the number of pieces of reset data to be averaged is increased, the degree of accuracy of the LPF is improved. By performing subtraction processing with pixel data including a low-frequency 1/f noise component and the reset data obtained after the averaging, it is possible to effectively remove the 1/f noise component from the pixel data. It can be considered that the subtraction processing is equivalent to the high-pass filtering (HPF) of the pixel data. That is, in the above-described correction processing, both of the LPF and the HPF can be performed upon each of the pixel data elements, but without using actual filtering hardware for each pixel element. When pieces of data to be used for the subtraction processing are temporally closer to each other, the degree of the HPF is improved. By reducing a 1/f noise component that is a cause of noise in the form of stripes, an artifact on a resulting image can be substantially reduced. Thus, using the correction processing unit 400 for performing the above-described correction processing, even if a reading circuit or an A/D converter having a small element size is used, it is possible to reduce an artifact caused by 1/f noise generated by the reading circuit or the A/D converter on an acquired image.

In the first embodiment, pixel data is output using in parallel two reading circuit units and two A/D converters, one of which corresponds to the first pixel group 101a and the other one of which corresponds to the second pixel group 101b. In this case, a noise characteristic of a set of the first reading circuit 103a and the first A/D converter 104a and a noise characteristic of a set of the second reading circuit 103b and the second A/D converter 104b may be different from each other. On an acquired image, an image step may be generated by the first pixel group 101a and the second pixel group 101b. When the above-described correction processing is performed, it is possible to effectively reduce noise caused by each reading circuit unit and each A/D converter. Accordingly, even if reading circuit units are used in parallel and A/D converters are used in parallel, the generation of such an image step can be suppressed.

Second Embodiment

Next, the second embodiment of the present invention will be described with reference to FIGS. 6 and 7. An apparatus used in the second embodiment is the same as that used in the first embodiment except for a correction processing unit. An operation performed in the second embodiment is different from that performed in the first embodiment. The detailed description of a configuration and an operation which have already been described in the first embodiment will be omitted.

Figure 6:
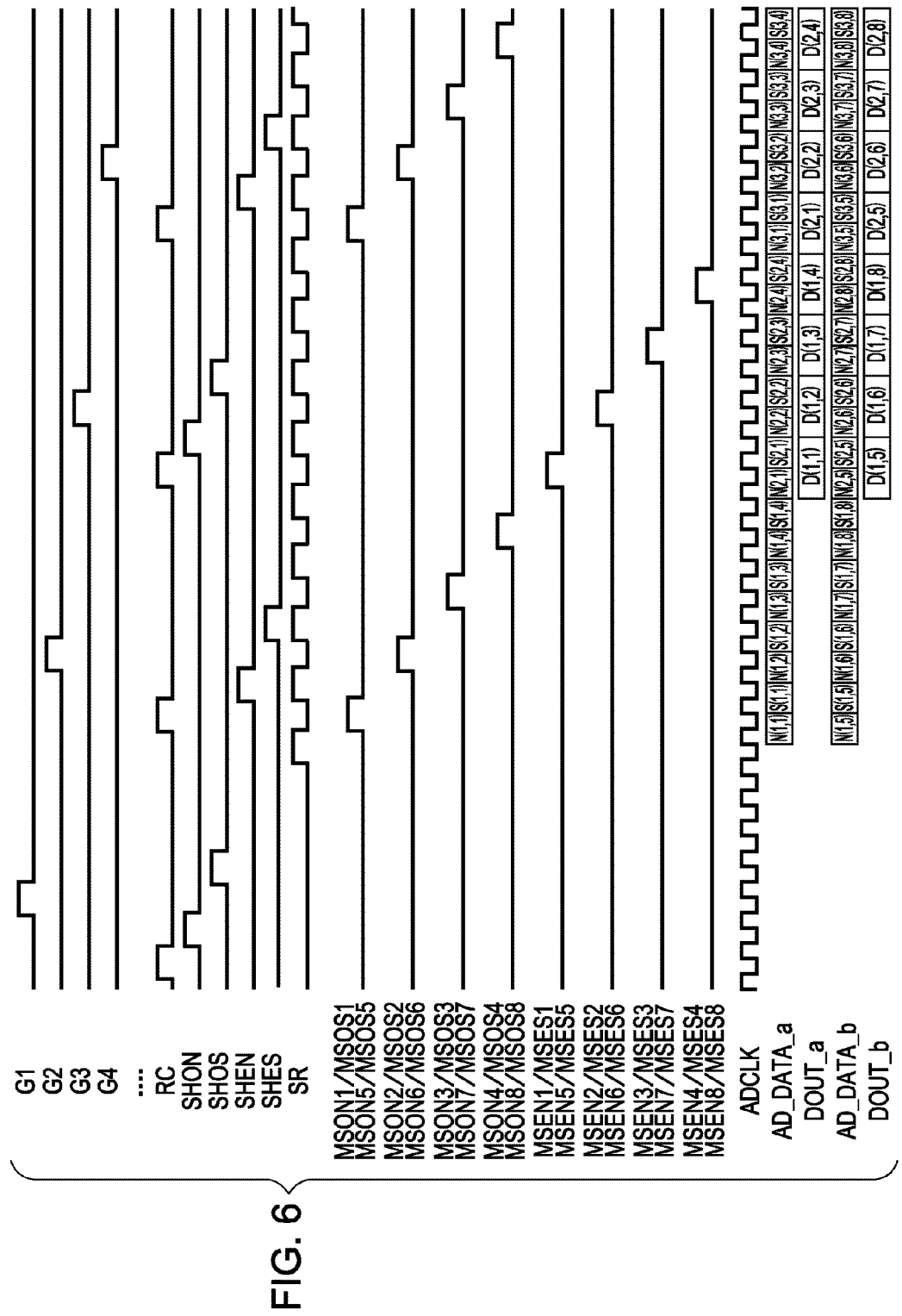
FIG. 6 is a timing chart describing an image pickup operation performed by an image pickup apparatus according to a second embodiment of the present invention.
Figure 7:
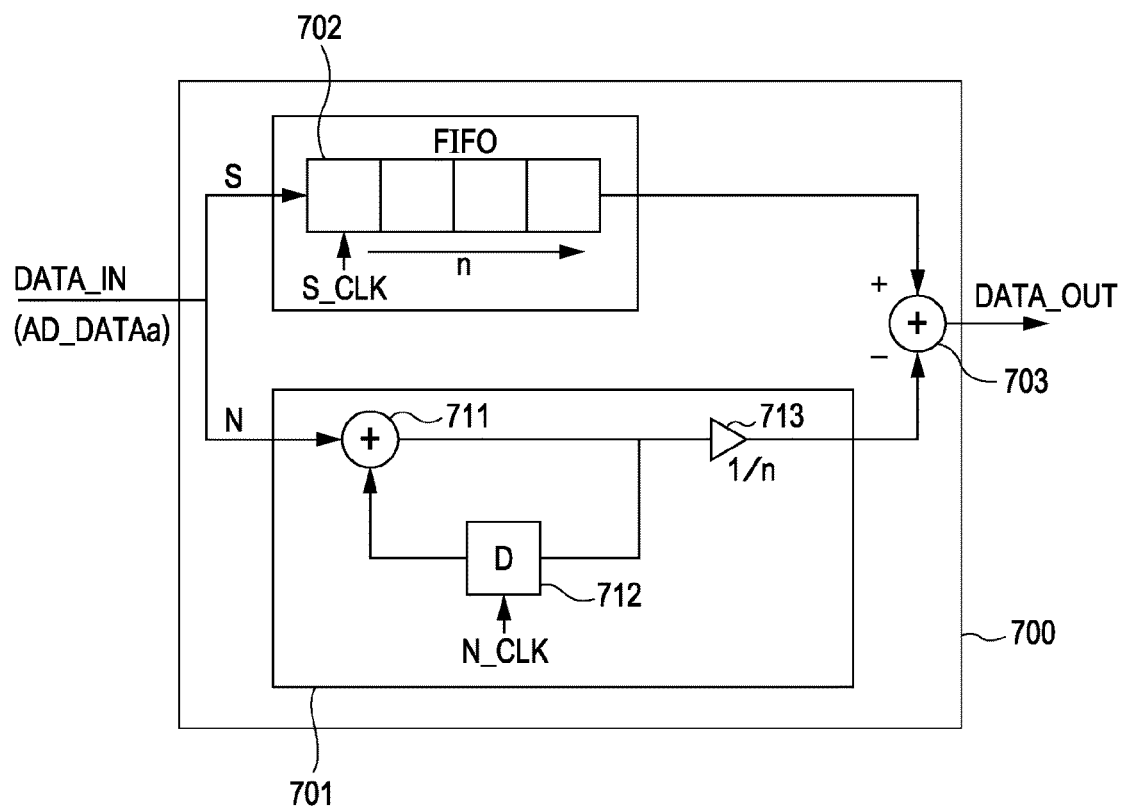
FIG. 7 is a block diagram illustrating a correction processing unit included in an image pickup apparatus according to the second embodiment of the present invention.

FIG. 6 is a timing chart describing an image pickup operation according to the second embodiment. FIG. 7 is a block diagram describing a correction processing unit 700 according to the second embodiment. In a signal processing operation according to the second embodiment, a pseudo reset data output operation is not performed. Accordingly, a period of time required for a signal processing operation and a reading operation in the second embodiment is shorter than that in the first embodiment. In correction processing according to the second embodiment, averaging is performed using all of the pieces of reset data obtained by the signal processing operation in units of rows. The correction processing unit 700 includes a reset data processing unit 701, a pixel data processing unit 702, and an adder 703. The reset data processing unit 701 includes an adder 711, a delay element 712, and a multiplier 713. N_CLK illustrated in FIG. 4B is supplied to the delay element 712. The pixel data processing unit 702 is composed, for example, of a First-In First-Out (FIFO) register. S_CLK illustrated in FIG. 4B is supplied to the pixel data processing unit 702.

The digital data N(1, 1) output from the first A/D converter 104a is input into the correction processing unit 700, and is stored in the delay element 712 in the reset data processing unit 701 in accordance with the rise of N_CLK. Subsequently, the digital data S(1, 1) is input into the correction processing unit 700, and is stored in the FIFO in the pixel data processing unit 702 in accordance with the rise of S_CLK. Subsequently, the digital data N(1, 2) is input into the correction processing unit 700. The adder 711 adds the digital data N(1, 2) and the digital data N(1, 1) and stores a result of the addition in the delay element 712 in accordance with the rise of N_CLK. Subsequently, the digital data S(1, 2) is input into the correction processing unit 700, and is stored in the FIFO in accordance with the rise of S_CLK. Subsequently, the digital data N(1, 3) is input into the correction processing unit 700. The adder 711 adds the digital data N(1, 3), the digital data N(1, 1), and the digital data N(1, 2), and stores a result of the addition in the delay element 712 in accordance with the rise of N_CLK. Subsequently, the digital data S(1, 3) is input into the correction processing unit 700, and is stored in the FIFO in accordance with the rise of S_CLK. Subsequently, the digital data N(1, 4) is input into the correction processing unit 700. The adder 711 adds the digital data N(1, 4), the digital data N(1, 1), the digital data N(1, 2), and the digital data N(1, 3), and stores a result of the addition in the delay element 712 in accordance with the rise of N_CLK. The quarter of the result of the addition is calculated by the multiplier 713 for averaging and is then input into the adder 703. Subsequently, the digital data S(1, 4) is input into the correction processing unit 700, and is stored in the FIFO in accordance with the rise of S_CLK. The digital data S(1, 1) is input from the FIFO into the adder 703. The adder 703 performs subtraction processing with data output from the pixel data processing unit 702 and data output from the reset data processing unit 701 and outputs the corrected pixel data D(1, 1). The corrected pixel data D(1, 1) is calculated as follows: S(1, 1)−(N(1, 1)+N(1, 2)+N(1, 3)+N(1, 4))/4. The corrected pixel data D(1, 2) is calculated as follows: S(1, 2)−(N(1, 1)+N(1, 2)+N(1, 3)+N(1, 4))/4.

In the second embodiment, when the number of pixels in the row direction is increased, the degree of accuracy of the LPF is improved as compared with the first embodiment. The correction processing can be more effectively performed. Since the pseudo reset data output operation is not performed, it is possible to reduce a period of time required for a signal processing operation and a reading operation as compared with the first embodiment. However, since the correction processing of pixel data cannot be started until all of pieces of reset data are input into the correction processing unit 700 on a row-by-row basis, a period of time required for the correction processing may be increased.

Third Embodiment

The third embodiment of the present invention will be described with reference to FIG. 8. In the third embodiment, an operation performed in the third embodiment is different from that performed in the first and second embodiments. The detailed description of a configuration and an operation which have already been described in the first and second embodiments will be omitted.

Figure 8:
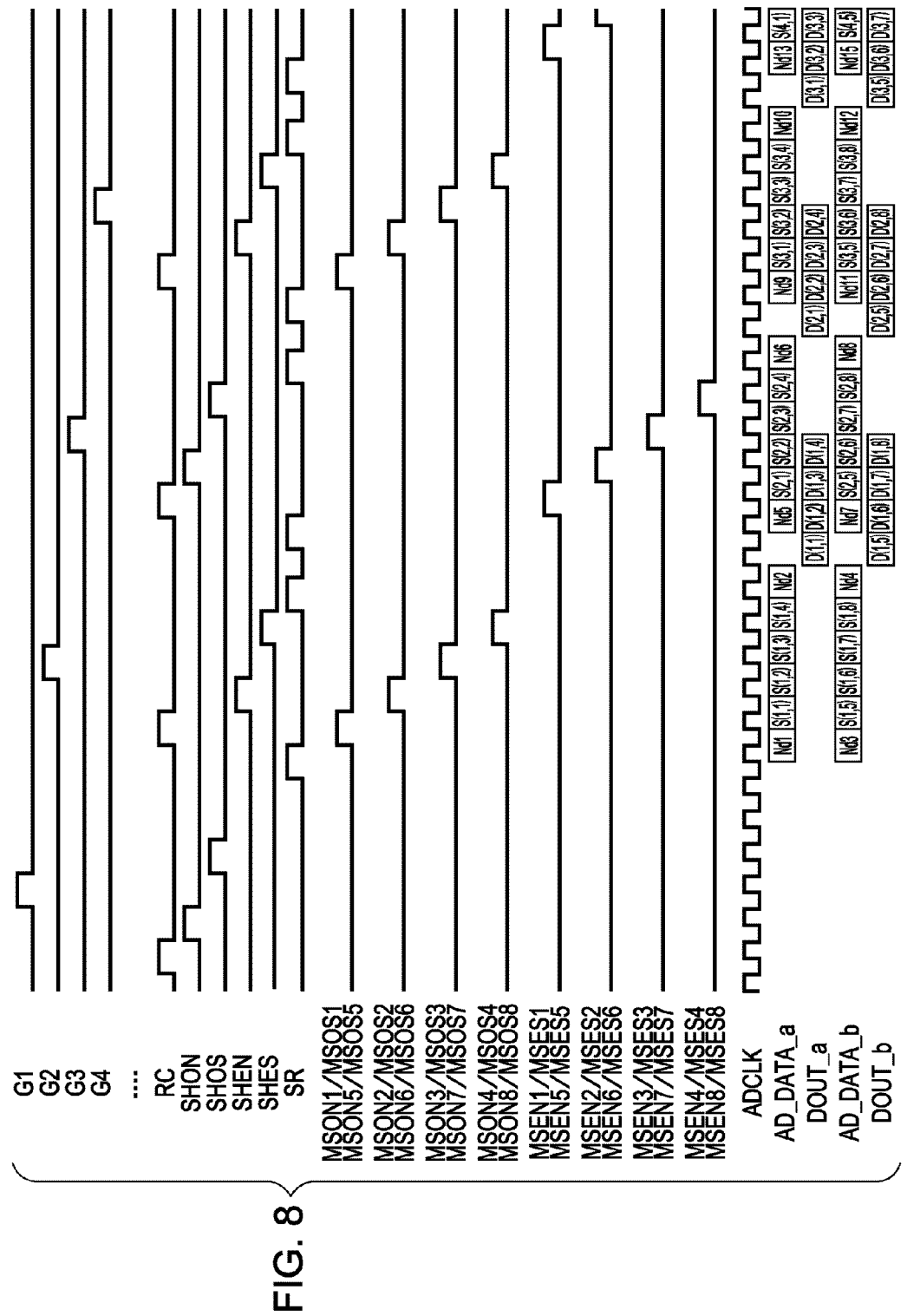
FIG. 8 is a timing chart describing an image pickup operation performed by an image pickup apparatus according to a third embodiment of the present invention.

FIG. 8 is a timing chart describing an image pickup operation according to the third embodiment. A first pseudo reset data output operation is performed before a first pixel data output operation is performed in the period of the signal processing operation in units of rows. A second pseudo reset data output operation is performed after the last pixel data output operation has been performed. A reset data output operation is not performed between pixel data output operations. Accordingly, a period of time required for a signal processing operation and a reading operation in the third embodiment is shorter than that in the first and second embodiments. In correction processing according to the third embodiment, averaging is performed using pieces of reset data obtained by the pseudo reset data output operation in units of rows. The corrected pixel data D(1, 1) is calculated as follows: S(1, 1)−($N_{d1}$+$N_{d2}$)/2. The corrected pixel data D(1, 2) is calculated as follows: S(1, 2)−($N_{d1}$+$N_{d2}$)/2.

In the third embodiment, since the reset data output operation is not performed between pixel data output operations, it is possible to reduce a period of time required for a signal processing operation and a reading operation as compared with the first and second embodiments. However, since the correction processing of pixel data cannot be started until reset data obtained in the last reset data output operation is input into the correction processing unit, a period of time before the correction processing is started may be increased.

Fourth Embodiment

Next, the fourth embodiment of the present invention will be described with reference to FIG. 9. In the fourth embodiment, a reading circuit has a configuration different from that described in the first embodiment, and a method of using the reading circuit is different from that described in the first embodiment. The difference between the fourth embodiment and the first embodiment will be described with reference to the first reading circuit 103a.

Figure 9:
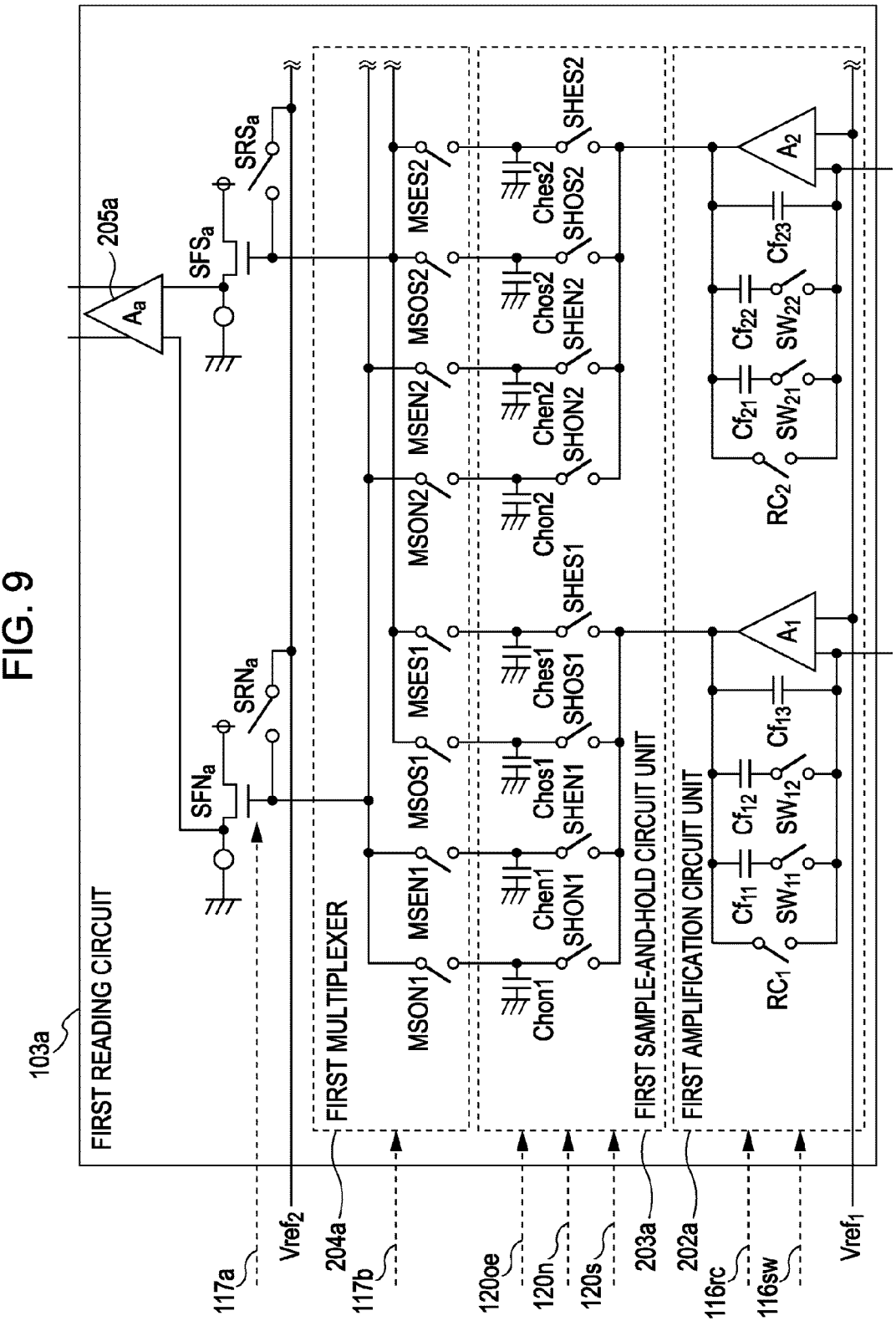
FIG. 9 is an equivalent circuit diagram of a reading circuit included in an image pickup apparatus according to a fourth embodiment of the present invention.

FIG. 9 is an equivalent circuit diagram describing a reading circuit according to the fourth embodiment. In the fourth embodiment, as the first amplification circuit unit 202a, an amplification circuit having a variable amplification factor is used. The control unit 108 switches between the amplification factors of the amplification circuit unit 202 in accordance with an image capturing mode. In a radiation imaging apparatus suitable for imaging diagnosis, for example, the control unit 108 may switch between the amplification factors of the amplification circuit unit 202 in accordance with a fluoroscopy mode (moving image capturing mode) or a general image capturing mode (still image capturing mode) by supplying a control signal 116sw to the amplification circuit unit 202. In the fourth embodiment, the amplification factor of the amplification circuit unit 202 is controlled so that an amplification factor ten times of that used in the general image capturing mode is set in the fluoroscopy mode.

When the amplification factor of the amplification circuit unit 202 is high, noise included in pixel data is mostly noise generated by the detection unit 101 and the amplification circuit unit 202. Accordingly, the effect of a 1/f noise component generated by the first variable amplifier 205a and the first A/D converter 104a becomes relatively small. An artifact caused by 1/f noise becomes inconspicuous on an image.

In the fourth embodiment, the control unit 108 controls the reading circuit unit 103 and the correction processing unit 400 so that the above-described correction processing is not performed in a first image capturing mode in which the amplification factor of the amplification circuit unit 202 is high and the above-described correction processing is performed in a second image capturing mode in which the amplification factor of the amplification circuit unit 202 is low. When noise in the form of stripes is equal to or less than one tenth of random noise on an image obtained when the correction processing is not performed, the correction processing may not be performed. When noise in the form of stripes is more than one tenth of random noise, the correction processing is required to be performed. Similarly, when an image step portion is equal to or less than one tenth of random noise on an image obtained when the correction processing is not performed, the correction processing may not be performed. When an image step portion is more than one tenth of random noise, the correction processing is required to be performed. It is determined in advance whether the correction processing is performed in each image capturing mode on the basis of the above-described criteria, and the control unit 108 performs the above-described control processing.

Thus, control processing is performed so that the correction processing is not performed in an image capturing mode in which the correction processing is not required. As a result, it is possible to reduce a period of time required for an image capturing operation, and it is possible to increase a reading frame rate. It is highly desirable, for example, that a reading frame rate can be increased in fluoroscopy like in the fourth embodiment, in order to reduce patient exposure to radiation.

Exemplary Application

Figure 10A:
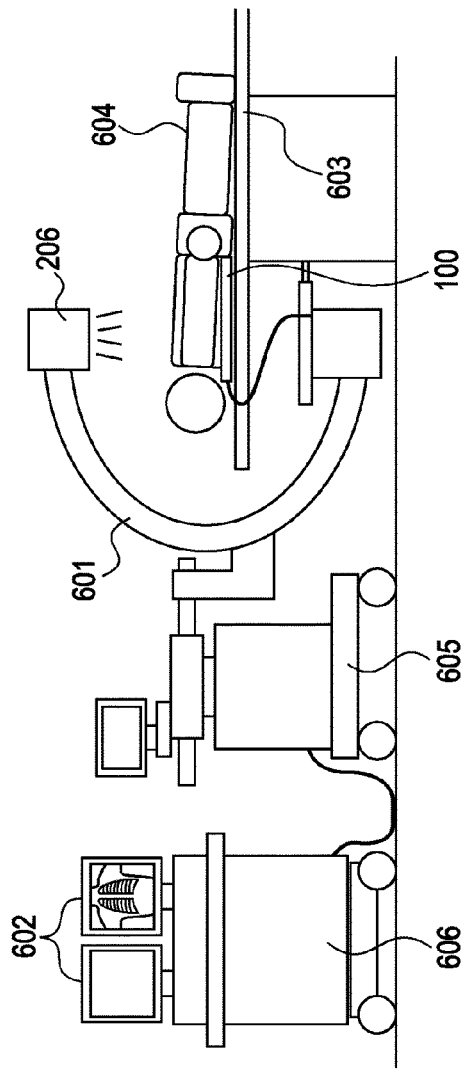
FIGS. 10A and 10B are schematic diagrams describing a radiation imaging system using an image pickup apparatus according to an embodiment of the present invention.
Figure 10B:
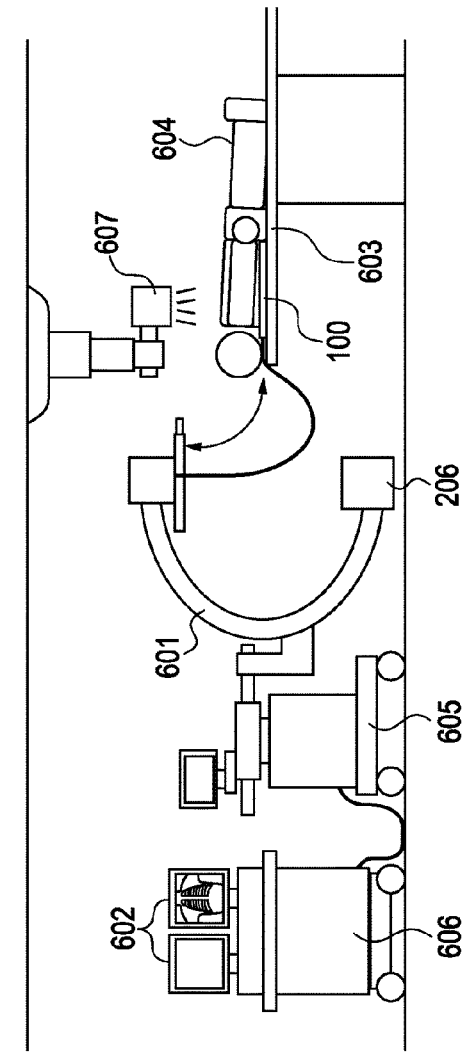

FIGS. 10A and 10B illustrate an exemplary application of a mobile radiation imaging system according to an embodiment of the present invention. FIG. 10A is a schematic diagram illustrating a radiation imaging system using a mobile radiation imaging apparatus capable of performing fluoroscopy and still image capturing. FIG. 10A illustrates a case in which the image pickup apparatus 100 is removed from a C-type arm 601 and image capturing is performed with a radiation generation apparatus 206 disposed at the C-type arm 601. The C-type arm 601 holds the radiation generation apparatus 206 and the image pickup apparatus 100. A display unit 602 can display an image with image data acquired by the image pickup apparatus 100. A bed 603 is used to place a test object 604 thereon. A carriage 605 allows the radiation generation apparatus 206, the image pickup apparatus 100, and the C-type arm 601 to move. A mobile control apparatus 606 can control the radiation generation apparatus 206, the image pickup apparatus 100, and the C-type arm 601. The mobile control apparatus 606 can perform image processing upon an image signal acquired by the image pickup apparatus 100 and transfer generated image data to the display unit 602. The image data generated by the mobile control apparatus 606 can be transferred to a remote place via a transfer unit such as a telephone line. It is therefore possible to display an image on a display screen in a remote place, for example, a doctor room with the image data or store the image data in a storage unit such as an optical disc in the doctor room. This allows a doctor in the doctor room to perform a medical diagnosis. The transferred image data can be recorded on a film by a film processor. The control unit 108 may be wholly or partially provided in the image pickup apparatus 100, or may be provided in the mobile control apparatus 606.

FIG. 10B is a diagram illustrating a radiation imaging system using a mobile radiation imaging apparatus capable of performing fluoroscopy and still image capturing. FIG. 10B illustrates a case in which the image pickup apparatus 100 is removed from the C-type arm 601 and image capturing is performed with a radiation generation apparatus 607 without using the radiation generation apparatus 206 disposed at the C-type arm 601. The control unit 108 can control not only the radiation generation apparatus 206 but also the radiation generation apparatus 607.

An embodiment of the present invention can be implemented by executing a program with, for example, a computer. Furthermore, a medium for supplying the above-described program to the computer, for example, a computer-readable recording medium such as a Compact Disc-Read-Only Memory (CD-ROM) storing the above-described program, or a transmission medium such as the Internet for transmitting the above-described program can be included in the scope of the present invention. The program can be applied as an embodiment of the present invention. The program, the recording medium, the transfer medium, and a program product are included in the scope of the present invention. In the above-described embodiments, a digital data processing unit in the image pickup apparatus 100 performs correction processing. However, an external apparatus of the image pickup apparatus 100, for example, the mobile control apparatus 606, may perform the correction processing.

While the present invention has been described with reference to exemplary embodiments, it is to be understood that the invention is not limited to the disclosed exemplary embodiments. For example, at least one embodiment of the present invention has been described as an image pick up apparatus suitable for imaging in medical diagnosis or industrial nondestructive inspection. Other embodiments may be suitable for imaging in general photography or even in experimental physics. To that end, the radiation described in this specification may include an X-ray, an electromagnetic wave such as a γ-ray, an α-ray, and a β-ray. Accordingly, the scope of the following claims is to be accorded the broadest interpretation so as to encompass all such modifications and equivalent structures and functions.

This application claims the benefit of Japanese Patent Application No. 2009-155665 filed Jun. 30, 2009, which is hereby incorporated by reference herein in its entirety.

What is claimed is:

1. An image pickup apparatus comprising:
a detection unit having a matrix of a plurality of pixels for converting radiation or light into electric charge and outputting analog electric signals based on the electric charge;
a reading circuit including a reset unit configured to output a plurality of reset signals, and configured to perform a signal processing operation for outputting the plurality of reset signals during an interval of outputting a plurality of pixel signals based on the analog electric signals output from the plurality of pixels;
an analog-to-digital (A/D) converter configured to sequentially convert the plurality of pixel signals and the plurality of reset signals that are output from the reading circuit into a plurality of pieces of pixel data and a plurality of pieces of reset data, respectively, the pixel data and the reset data being digital data, and output the digital data;
a correction processing unit configured to perform correction processing on the plurality of pieces of pixel data,
wherein the correction processing unit performs subtraction processing on each of the plurality of pieces of pixel data by using a value obtained by averaging at least part of the plurality of pieces of reset data, and
wherein the at least part of the plurality of pieces of reset data to be averaged includes reset data output from the A/D converter temporally before each of the plurality of pieces of pixel data is output from the A/D converter, and reset data output from the A/D converter temporally after each of the plurality of pieces of pixel data is output from the A/D converter.

2. The image pickup apparatus according to claim 1, wherein, wherein, when the correction processing unit is to average the at least part of the plurality of pieces of reset data, the correction processing unit averages, among the plurality of pieces of reset data, a plurality of pieces of reset data temporally close to the output of each of the plurality of pieces of pixel data from the A/D converter.

3. The image pickup apparatus according to claim 2, wherein the correction processing unit averages all of the plurality of pieces of reset data output from the A/D converter.

4. The image pickup apparatus according to claim 1, wherein, when the correction processing unit is to average the at least part of the plurality of pieces of reset data, the correction processing unit averages, among the plurality of pieces of reset data, a plurality of pieces of reset data which is temporally close to the output of each of the plurality of pieces of pixel data from the A/D converter and which includes equal numbers of pieces of reset data output before and after the output of each of the plurality of pieces of pixel data.

5. The image pickup apparatus according to claim 4, wherein first reset data that is among the plurality of pieces of reset data and is output from the A/D converter temporally before predetermined pieces of pixel data among the plurality of pieces of pixel data, the predetermined pieces of pixel data, and second reset data that is among the plurality of pieces of reset data and is output from the A/D converter temporally after the predetermined pieces of pixel data are sequentially output to the correction processing unit, and wherein, when the correction processing unit is to average the at least part of the plurality of pieces of reset data, the correction processing unit averages, among the plurality of pieces of reset data, a plurality of pieces of reset data including the first reset data and the second reset data.

6. The image pickup apparatus according to claim 1, wherein the signal processing operation includes a reset data output operation for causing the reading circuit and the A/D converter to output each of the plurality of pieces of reset data to the correction processing unit and a pixel data output operation for causing the reading circuit and the A/D converter to output each of the plurality of pieces of pixel data to the correction processing unit, and the reset data output operation is not performed during a period in which a plurality of the pixel data output operations is performed, and wherein the reset data output operation includes a first pseudo reset data output operation for causing the reading circuit and the A/D converter to output, in a period in which the signal processing operation corresponding to a predetermined row of the plurality of pixels in the detection unit is performed, each of the plurality of pieces of reset data before the pixel data output operation is performed first in the period, and a second pseudo reset data output operation for causing the reading circuit and the A/D converter to output, in the period, each of the plurality of pieces of reset data after the pixel data output operation is performed last in the period, and wherein the correction processing unit averages the reset data output in the first pseudo reset data output operation and the reset data output in the second pseudo reset data output operation.

7. The image pickup apparatus according to claim 1,
further comprising a control unit configured to control the reading circuit, the A/D converter, and the correction processing unit according to each of a plurality of image capturing modes,
wherein the control unit controls the reading circuit, the A/D converter, and the correction processing unit so that the correction processing is not performed in one of the plurality of image capturing modes in which noise in a form of stripes is not more than one tenth of random noise on image data obtained without performing the correction processing, and the correction processing is performed in another one of the plurality of image capturing modes in which the noise in a form of stripes is more than one tenth of random noise on the image data.

8. An image pickup system comprising:
the image pickup apparatus according to claim 1; and
a display unit capable of displaying image data acquired by the image pickup apparatus.

9. The image pickup apparatus according to claim 1,
wherein the signal processing operation includes a reset data output operation for causing the reading circuit and the A/D converter to output each of the plurality of pieces of reset data to the correction processing unit, a pixel data output operation for causing the reading circuit and the A/D converter to output each of the plurality of pieces of pixel data to the correction processing unit, and a pseudo reset data output operation for causing the reading circuit and the A/D converter to output, in a period in which the signal processing operation corresponding to a predetermined row of the plurality of pixels in the detection unit is performed, each of the plurality of pieces of reset data before the pixel data output operation is performed first in the period or after the pixel data output operation is performed last in the period.

10. The image pickup apparatus according claim 1:
wherein the plurality of pixels in the detection unit is divided into a plurality of pixel groups,
wherein a plurality of the reading circuits and a plurality of the A/D converters are provided each of which corresponds to a different one of the plurality of pixel groups,
wherein each of the plurality of reading circuits includes the reset unit and outputs, in a period in which the signal processing operation corresponding to a predetermined row of the plurality of pixels in the detection unit is performed, the plurality of reset signals during the interval of outputting the plurality of pixel signals corresponding to the predetermined row of the plurality of pixels in the different one of the plurality of pixel groups corresponding to each of the plurality of reading circuits,
wherein each of the plurality of A/D converters sequentially converts the plurality of pixel signals and the plurality of reset signals, which are output from a corresponding one of the plurality of reading circuits in the period, into a plurality of pieces of pixel data and a plurality of pieces of reset data, respectively, the pixel data and the reset data being digital data, and outputs the digital data, and
wherein the correction processing unit performs subtraction processing on each of the plurality of pieces of pixel data output from each of the plurality of A/D converters by using a value obtained by averaging reset data that is output from the A/D converter temporally before each of the plurality of pieces of pixel data is output from the A/D converter, and reset data that is output from the A/D converter temporally after each of the plurality of pieces of pixel data is output from the A/D converter.

11. A control method of an image pickup apparatus including a detection unit having a matrix of a plurality of pixels for converting radiation or light into electric charge and outputting analog electric signals based on the electric charge, a reading circuit including a reset unit configured to reset a plurality of reset signals, and configured to perform a signal processing operation for outputting the plurality of reset signals during an interval of outputting a plurality of pixel signals based on the analog electric signals output from the plurality of pixels, an A/D converter configured to sequentially convert the plurality of pixel signals and the plurality of reset signals that are output from the reading circuit into a plurality of pieces of pixel data and a plurality of pieces of reset data, respectively, the pixel data and the reset data being digital data, and output the digital data, and a correction processing unit configured to perform correction processing on the plurality of pieces of pixel data, the control method comprising:
controlling the correction processing unit to perform subtraction processing on each of the plurality of pieces of pixel data by using a value obtained by averaging at least part of the plurality of pieces of reset data,
wherein the at least part of the plurality of pieces of reset data to be averaged includes reset data output from the A/D converter temporally before each of the plurality of pieces of pixel data is output from the A/D converter, and reset data output from the A/D converter temporally after each of the plurality of pieces of pixel data is output from the A/D converter.

12. A digital data processing unit comprising:
a first processing unit configured to average a plurality of pieces of reset data into which a plurality of reset signals are converted by an A/D conversion unit, wherein the plurality of reset signal includes reset signals output to the A/D conversion unit by a reset unit temporally before input of digital data to be corrected, and reset signals output to the A/D conversion unit by the reset unit temporally after the input of the digital data to be corrected; and
a second processing unit configured to subtract the averaged reset data from the digital data to be corrected.

13. The digital data processing unit according to claim 12, wherein the first processing unit averages the plurality of pieces of reset data which is temporally close to the input of the digital data and is obtained by converting equal numbers of the reset signals output to the A/D conversion unit before and after the input of the digital data.

14. A signal processing apparatus comprising:
a reading circuit including a reset unit;
the A/D conversion unit; and
the digital data processing unit according to claim 12.

* * * * *